United States Patent [19]

Lin

[11] Patent Number: 5,485,227
[45] Date of Patent: Jan. 16, 1996

[54] LIGHT TRANSMISSION ADJUSTABLE SPECTACLES

[76] Inventor: Chwen Y. Lin, No. 170, Fwucherng Rd., Fwucherng Li, Tourcherng Jenn, Yilan Hsien, Taiwan

[21] Appl. No.: 395,954

[22] Filed: Feb. 28, 1995

[51] Int. Cl.⁶ ............................................. G02C 7/16
[52] U.S. Cl. ..................................... 351/46; 351/49
[58] Field of Search ............................. 351/41, 44, 46, 351/49; 2/13

[56] References Cited

U.S. PATENT DOCUMENTS

| | | | |
|---|---|---|---|
| 2,012,620 | 8/1935 | Bean et al. | 351/46 |
| 2,773,422 | 12/1956 | Flynn et al. | 351/49 |
| 3,867,020 | 2/1975 | Braunhut | 351/49 |

FOREIGN PATENT DOCUMENTS 189810  5/1957  Austria .................................. 351/46

Primary Examiner—William L. Sikes
Assistant Examiner—Huy Mai

[57] ABSTRACT

A light transmission adjustable spectacle structure comprises for each lens set thereof a fixed polaroid lens and a rotatable polaroid lens which has a number of non-polarized aperture-like areas formed thereon so that when the rotatable lens is rotated relative to the fixed lens to have the polarization directions thereof normal to each other, light is only allowed to pass through the apertures of the rotatable lens. This significantly cuts down the transmission of light through the lens set. In addition, by suitably selecting the size of the aperture-like areas, the depth of focus of retinal image occurring to a wearer of the spectacles is properly increased to provide a more clear view to the wearer.

12 Claims, 5 Drawing Sheets

LIGHT TRANSMISSION ADJUSTABLE SPECTACLES

BACKGROUND OF THE INVENTION (1) Field of the Invention

The present invention relates generally to spectacles and in particular to spectacles with double polaroid lenses of which one having multiple non-polarized aperture-like areas thereon by perforating or de-polarizing of portions of the lens.

(2) Description of the Prior Art

Eyeglasses with polarized elements are well known in the art. The concept of providing variable light transmission characteristics to an ophthalmic device by employing light polarizing elements which may be rotated with respect to each other is not new. For background information on systems of this type reference should be made to U.S. Pat. No. 2,005,246 issued to Edwin H. Land on Jun. 18, 1935, U.S. Pat. No. 2,251,330 issued to Murray N. Fairbank on Aug. 5, 1941, U.S. Pat. No. 2,565,362 issued to V. K. Eloranta on Aug. 21, 1951, U.S. Pat. No. 3,944,346 issued to A. Shindler on Mar. 16, 1976, U.S. Pat. No. 4,119,369 issued to V. K. Eloranta on Oct. 10, 1978, U.S. Pat. No. 4,113,364 issued to M. V. Dussich on Sep. 12, 1978, U.S. Pat. No. 4,386,832 issued to G. Nannini on Jun. 7, 1983. Each of the forgoing generally related to devices for providing variable light transmission by employing light polarizers. In those patents the light transmission will be cut down almost completely if the direction of the polarizers are held perpendicular to each other. This will be dangerous when the application is used as a sunglass of an automobile driver. Referring to U.S. Pat. No. 3,867,020 issued to H. N. Braunhut on Feb. 18, 1975 which teaches a polarizer set with exactly centrally located aperture and concentrically arranged opaque elements, which prevent light transmission having an angle of incidence greater than a predominant angle of acceptance. It is particularly used to control viewing angle. While fishing, it can eliminate the glare of water surface. But the light transmission is not homogeneously through the lens set, and because the aperture is single and exactly centrally located, the offset of visual axis due to pupil distance variation will significantly influence the actual application.

The present invention possesses many advantages over above mentioned designs in that it provides uniformly distributed multiple light transmission apertures and is relatively easily approached by visual axis. Centering of the application to visual axis is not so necessary. It eliminates the risk of totally shut down the light by providing residual light transmission through the multiple apertures.

In the art of photography, picture will be clearer when it is taken by a small aperture than a larger aperture. This is because the smaller aperture will increase the depth of focus. This is also true in our invention, by properly selected aperture size. When the light transmission is cut down maximally, the light transmission is only through the apertures, and it acts like reduced camera aperture to provide an increased depth of focus to the retinal image of the viewer. Hence it will increase the visual acuity of the viewer.

SUMMARY OF THE INVENTION

The principal objective of the present invention is to provide a light transmission adjustable spectacle structure which comprises, for each lens set, two polaroid lenses of which one is rotatable relative to the other and has a number of non-polarized aperture-like areas thereon so that when the two polaroid lenses are oriented to block light transmission therethrough, a minor portion of the light is still allowed to pass the multiple aperture-like areas thereof.

It is also an objective of the present invention to provide a spectacle structure which comprises, for each lens set, two polaroid lenses, of which one has a number of non-polarized aperture-like areas formed thereof so that when the two polaroid lenses are oriented to only allow light to pass through the aperture-like areas, these apertures serve to increase the depth of focus of retinal image for the wearer.

To achieve the above objectives, there is provided a light transmission adjustable spectacle structure which comprises for each lens set thereof a fixed polaroid lens and a rotatable polaroid lens which has a number of non-polarized aperture-like areas formed thereon so that when the rotatable lens is rotated relative to the fixed lens to have the polarization directions thereof normal to each other, light is only allowed to pass through the aperture-like areas of the rotatable lens. This significantly cuts down the transmission of light through the lens set. In addition, by suitably selecting the size of the aperture-like areas, the depth of focus of retinal image occurring to a wearer of the spectacles is properly increased to provide a more clear view to the wearer.

The instant invention will be apparent from the following description of preferred embodiments thereof illustrated in the attached drawings, wherein:

DETAILED DESCRIPTION OF THE PREFERRED EMBODIMENTS

Figure 1:
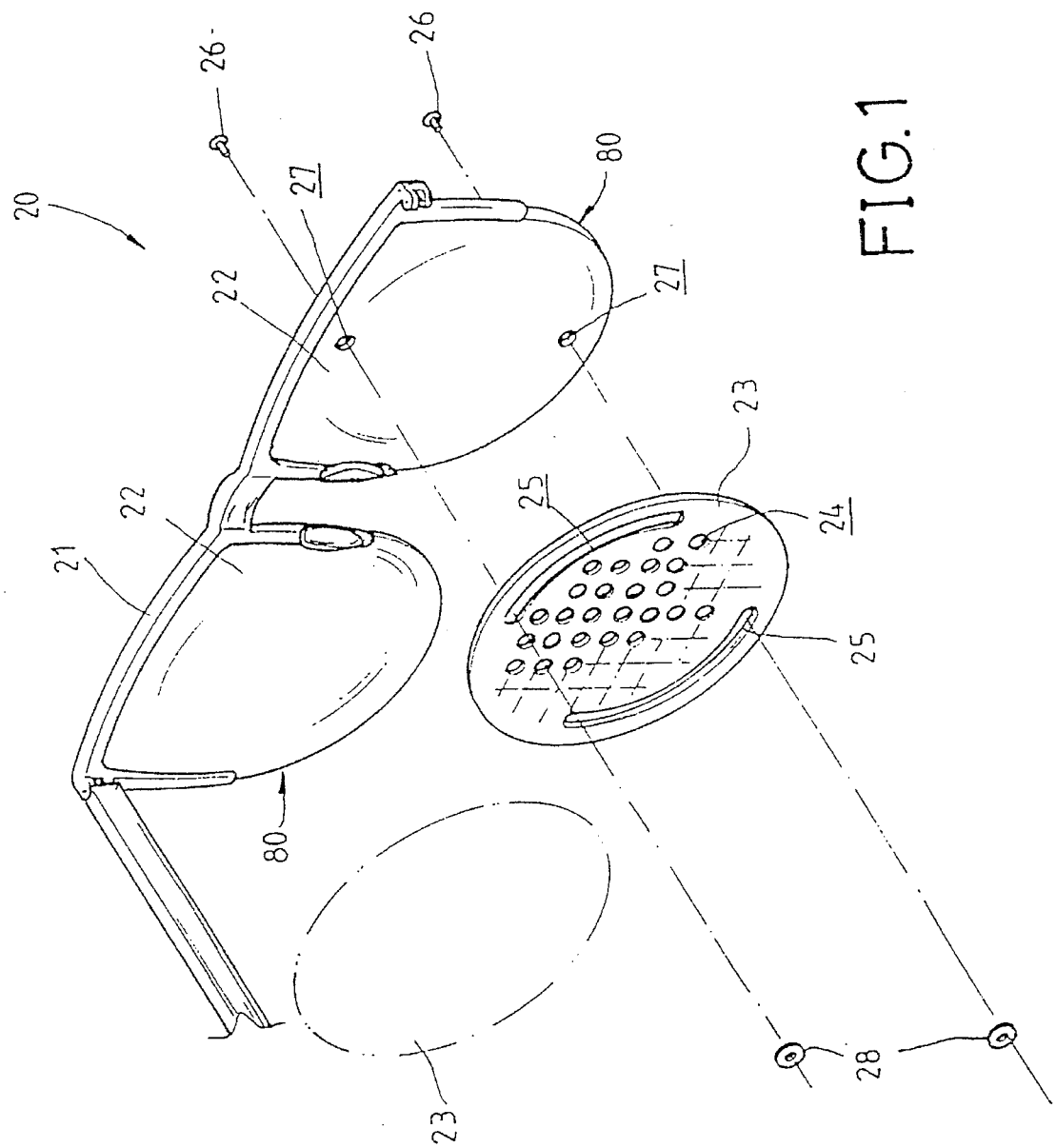
FIG. 1 is an exploded perspective view showing a spectacle structure in accordance with a first embodiment of the present invention.

With reference to the drawings and in particular to FIG. 1, wherein a pair of spectacles constructed in accordance with a first embodiment of the present invention, generally designated with the reference numeral 20, is shown, the spectacles 20 comprise a frame 21 on which two lens sets 80 are mounted, each comprising a first polaroid lenses 22 securely fixed on the frame 21 and a second polaroid lens 23 rotatably mounted to the fixed lens 22 to be rotatable relative to the fixed lens 22. On each of the rotatable lenses 23, a number of non-polarized aperture-like areas 24 are formed.

The non-polarized aperture-like areas 24 may be formed by simply drilling the lens 23 to form through holes or by de-polarizing the lens 23 to form plain, light-transmitting aperture-like areas which are not through holes and not polarized.

As is generally known, each polaroid lens has a specific polarization direction which only allows light waves vibrating in that direction to pass therethrough. It is also known that by placing two polaroid lenses having polarization directions normal to each other together, light can be blocked from passing through the lenses. Therefore, by rotating the rotatable lenses 23 with respect to the fixed lenses 22, the light transmission through the lenses is gradually reduced if the polarization directions thereof are changed from being parallel to being normal to each other. This is shown in FIGS. 5–7.

Figure 5:
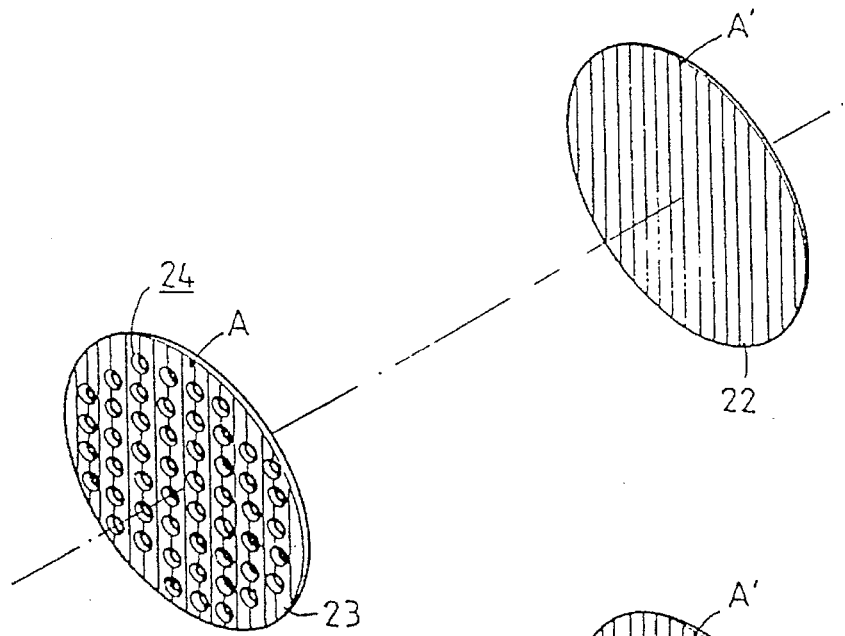
FIGS. 5–7 are plan views respectively showing conditions of light transmission when the polarizations of two polaroid lenses are of different relative orientations.
Figure 6:
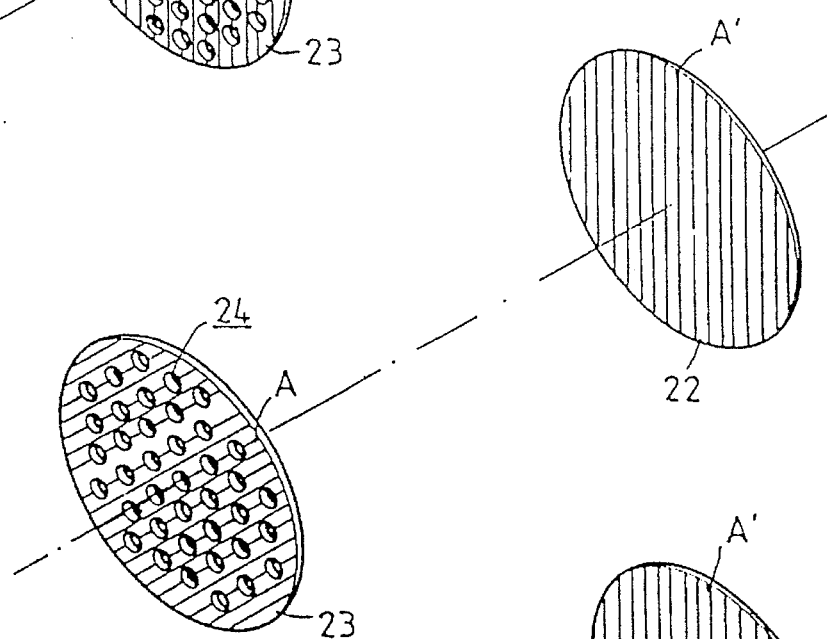
Figure 7:
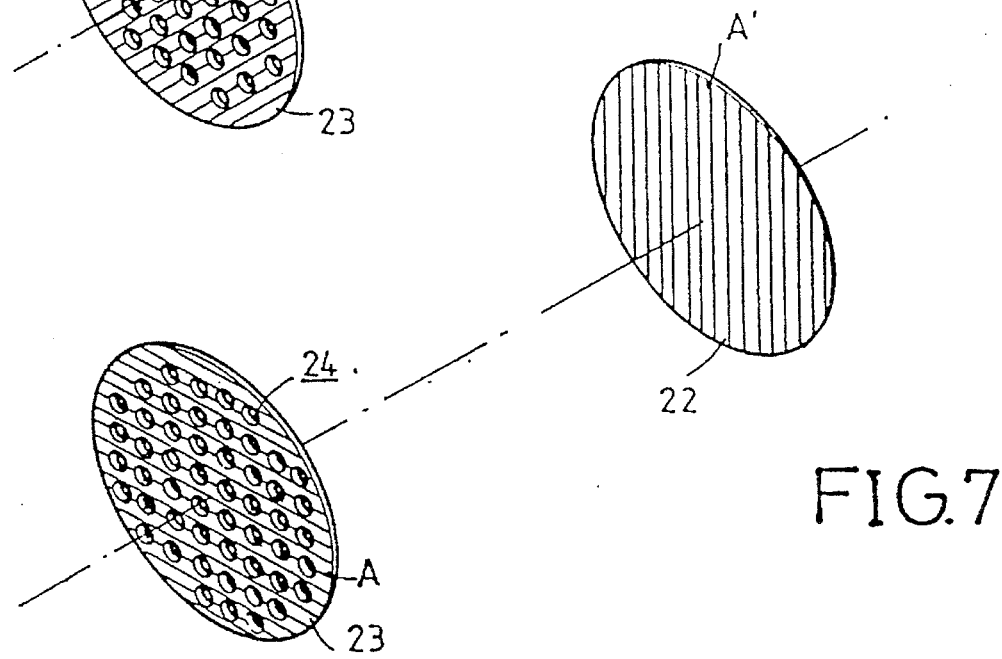

Preferably, as shown in FIGS. 5–7, marks A and A' are respectively provided on the rotatable lens 23 and the fixed lens 22 to indicate the relative orientation therebetween.

As can be observed in FIG. 5, wherein the polarization directions of the lenses 22 and 23 are generally parallel with each other, under such a situation, the light transmitting through the fixed lens 22 will not be further attenuated by the rotatable lens 23 and vice versa. Consequently, the light transmitting through the two lenses 22 and 23 will behavior as passing only one polaroid lens. The situation is almost exactly the same for the light transmitting through either the polarized portion or the non-polarized aperture-like areas 24 of the rotatable lens 23. The intensity of the light transmits through the aperture-like areas 24 is almost the same as that transmitting the non-apertured portion of the second lens 23 so that the aperture-like areas 24 are most invisible.

When the second lens 23 is rotated relative to the first lens 22 to have the polarization directions thereof no longer parallel with each other, nor normal to each other, as shown in FIG. 6, the light transmission through the non-apertured portion is reduced but that through the aperture-like areas 24 is not changed. This makes the apertures 24 more clear.

As the second lens 23 is rotated to have the polarization direction thereof normal to that of the fixed lens 22, as shown in FIG. 7, the light is completely blocked by the non-apertured portion of the rotatable lens 23 but is still allowed to pass through the aperture-like areas 24. This brings the apertures 24 to a significant condition for light transmission. By suitably selecting the size of the apertures 24, for example diameter in the case of small circular holes, the depth of focus to a wearer of the spectacles 20 can be increased. This, as mentioned previously, makes distant views more clear.

The change of the relative orientation between the fixed lens 22 and the rotatable lens 23 can be observed by noticing the orientation of mark A relative to mark A' shown in FIGS. 5–7.

Back to FIG. 1, to affix the second lenses 23 to the first fixed lenses 22, each of second lenses 23 is provided at least an arc slot 25, preferably two as shown in FIG. 1, to movably receive therein a guide mounted on the first lens 22, such as a screw 26 extending through a hole 27 formed on the first lens 23 rotatable with respect to the first lens 22. Nut means 28 may be provided to secure the second lens 23 on the screw 26 in a relatively rotatable manner with respect to the first lens 22.

Figure 2:
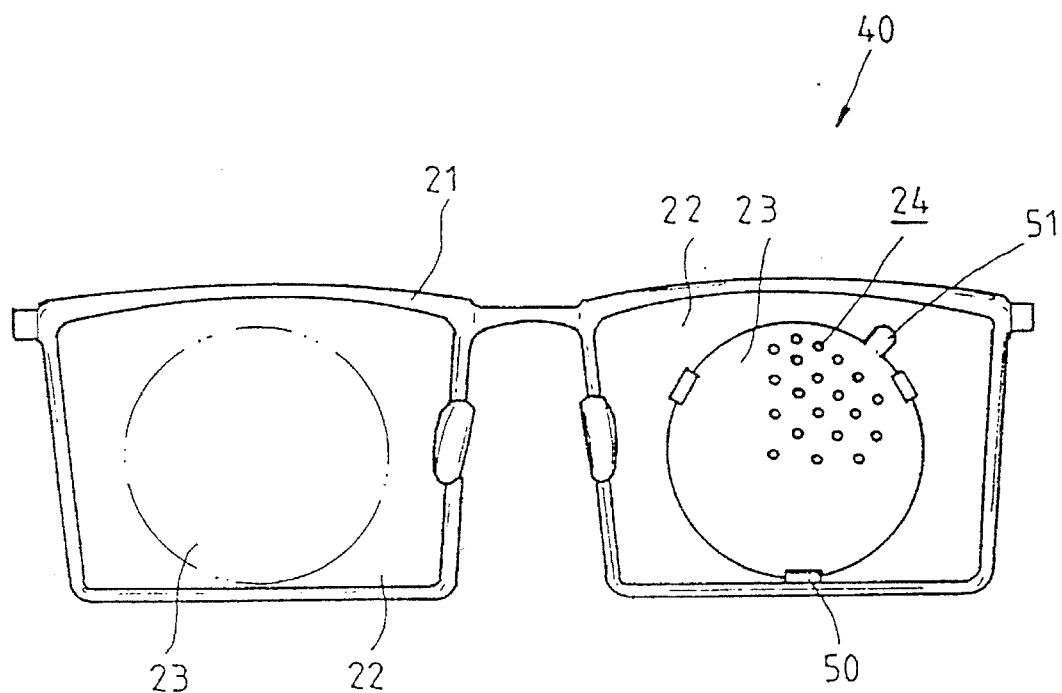
FIG. 2 is a front side view showing a spectacle structure in accordance with a second embodiment of the present invention.

In FIG. 2, a pair of spectacles constructed in accordance with a second embodiment of the present invention, generally designated with the reference numeral 40, is shown. In this drawing, parts similar to those of the embodiment of FIG. 1 are designated with similar reference numerals. In the second embodiment, each of the second lenses 23 is movably received within guiding channels 50 mounted to the respective first lens 22.

Figure 3:
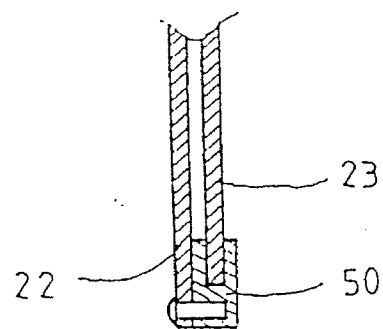
FIG. 3 is a partial cross-sectional view, in a larger scale, showing a portion of the second embodiment of the present invention shown in FIG. 2.

The structure of the guiding channels 50 is shown in detail in FIG. 3. As can be observed from FIG. 3, the second lens 23 is loosely received within the channels 50 at the peripheral edge thereof to enable the relative rotation therebetween.

Figure 4:
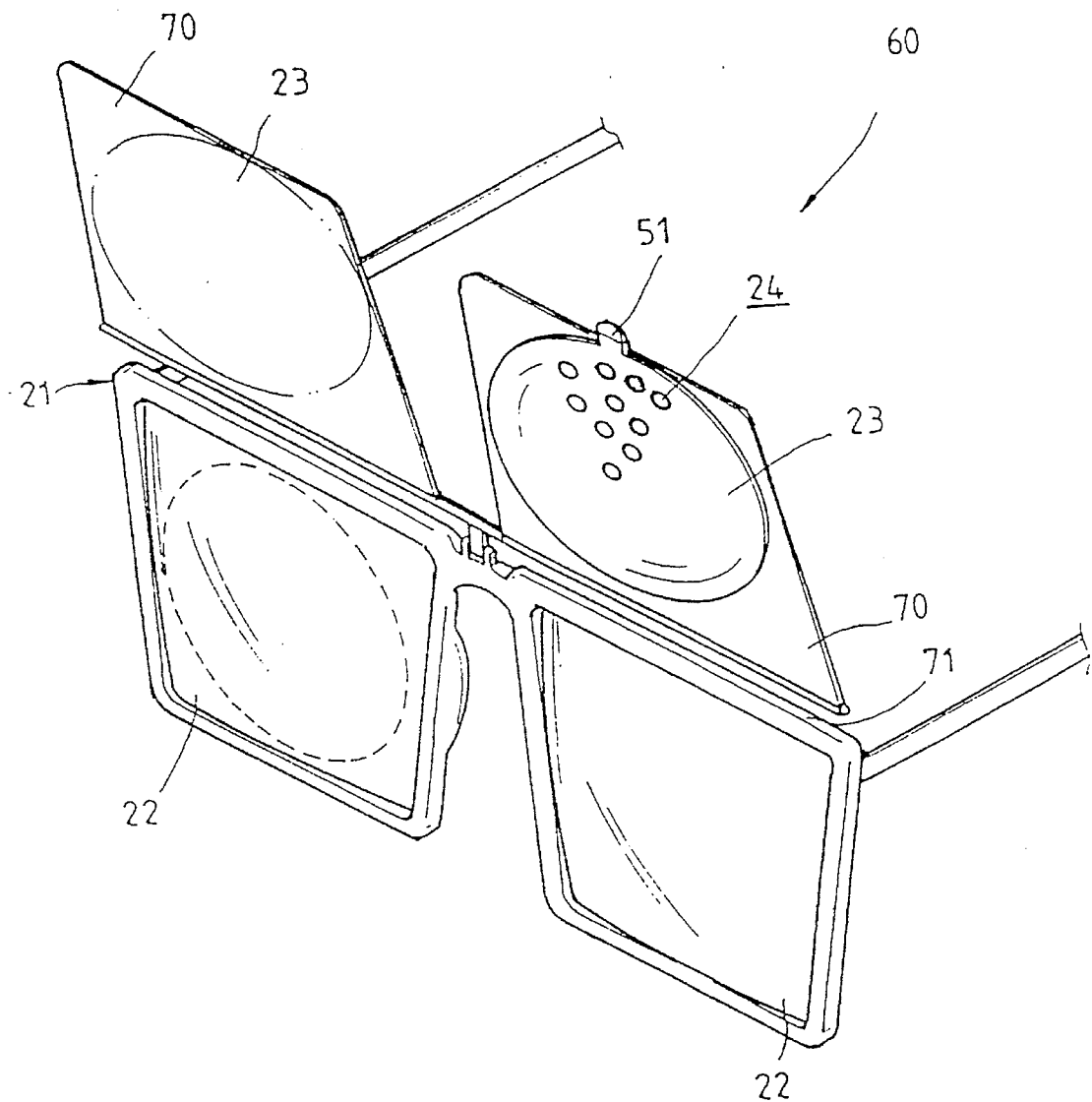
FIG. 4 is a perspective view showing a spectacle structure in accordance with a third embodiment of the present invention.

In FIG. 4, a pair of spectacles constructed in accordance with a third embodiment of the present invention, generally designated with the reference numeral 60, is shown. In this drawing, parts similar to those of the embodiments of FIGS. 1 and 2 are designated with similar reference numerals. In the third embodiment, each of the second lenses 23 is secured on a sheet member 70, preferably transparent, which is, for example, hinged to the frame 21 along a top edge 71 thereof to be rotatable relative to the first lens 22 to bring the second lens 23 to the proximity of the first lens 22. The second lens 23 may be also rotatably mounted to the transparent sheet 70.

As shown in FIGS. 2 and 4, preferably a handhold tab 51 is formed on each of the second lens 23 for manually rotating the second lens 23 relative to the respective first lens 22.

Figure 8:
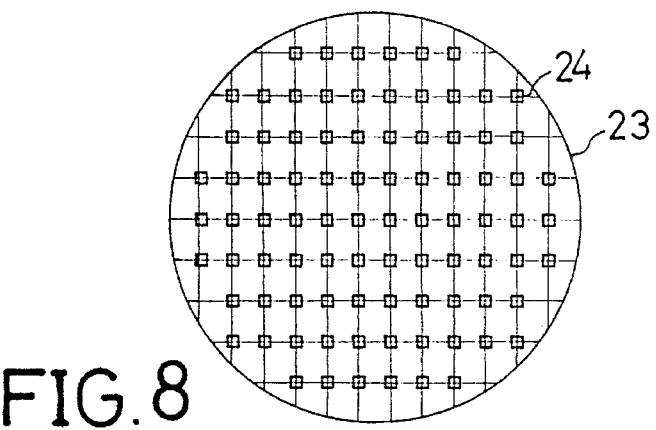
FIGS. 8–10 are plan views showing alternative arrangement of different aperture shapes of rotative second polarized lens.
Figure 9:
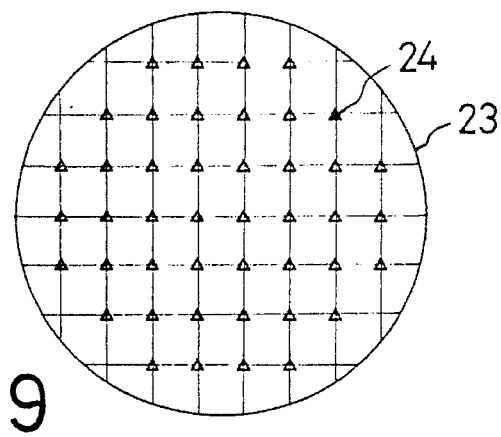

As shown in FIGS. 8 and 9, the apertures of the second lens 23 can be of the same shape of similar area uniformly distributed.

Figure 10:
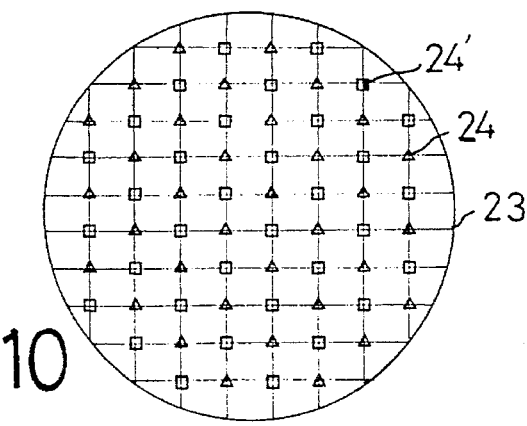

As shown in FIG. 10, the apertures of the second lens 23 can be of the different shapes arranged in a mixed fashion.

It is apparent that although the invention has been described in connection with the preferred embodiments, it is contemplated that those skilled in the art may make changes to certain features of the preferred embodiments without altering the basic concept of the invention as defined in the appended claims.

What is claimed is:

1. A light transmission adjustable spectacle structure, comprising a frame on which two lens sets are mounted, each of said lens sets comprising a first polaroid lens having a first polarization direction and a second polaroid lens having a second polarization direction rotatably mounted to said frame so as to have said second polaroid lens movable, relative to said first polaroid lens, between a first position where the second polarization direction is substantially oriented in such a direction with respect to the first polarization direction to allow light to pass through the lens set and a second position where the second polarization direction is substantially normal to the first polarization direction to block light transmission through the lens set, said second polaroid lens having multiple non-polarized aperture-like areas formed thereon to allow light to partially transmit therethrough when said second polaroid lens is in the second position.

2. A spectacle structure as claimed in claim 1, wherein each of said second lenses has at least an arc slot formed thereon to receive therein a guiding pin mounted on the respective first lens to allow said second lens to be rotatable relative to said first lens by the guiding of the pin within the arc slot so as to change the second polarization direction with respect to the first polarization direction.

3. A spectacle structure as claimed in claim 2, wherein said guiding pin comprises a screw extending through a hole formed on said first lens.

4. A spectacle structure as claimed in claim 2, wherein each of said second lenses has two arc slots formed thereon to respectively receive therein a guiding pin mounted on said first lens.

5. A spectacle structure as claimed in claim 1, wherein each of said first lenses comprises a guiding channel formed thereon to movably receive therein a peripheral edge of said second lens therein to allow said second lens to be rotatable relative to said first lens so as to change the second polarization direction with respect to the first polarization direction.

6. A spectacle structure as claimed in claim 1, wherein each of said second lenses is mounted on a sheet member hinged to said frame to allow said second lens to be rotatably movable between the first position where said second lens is away from the respective first lens to allow light to only transmit through said first lens and the second position where said first and second lenses are overlapping each other in such a manner to have the first and second polarization directions thereof normal to each other.

7. A spectacle structure as claimed in claim 6, wherein each of said second lenses is rotatably mounted to a sheet member.

8. A spectacle structure as claimed in claim 1, wherein said aperture-like areas are of the same shape.

9. A spectacle structure as claimed in claim 1, wherein said aperture-like areas are mixtures of the different shapes.

10. A spectacle structure as claimed in claim 1, wherein each of said second lenses comprises a handhold tab formed thereof for manually rotating said second lens relative to the respective first lens.

11. A spectacle structure as claimed in claim 1, wherein said aperture-like areas are formed on each of said second lenses by perforating.

12. A spectacle structure as claimed in claim 1, wherein said aperture-like areas are formed on each of said second lenses by de-polarizing portions of said second lens to provide thereon plain light-transmitting areas.

* * * * *